US010066616B2

(12) United States Patent
Adachi

(10) Patent No.: US 10,066,616 B2
(45) Date of Patent: Sep. 4, 2018

(54) PUMP AND METHOD FOR OPERATING PUMP

(75) Inventor: Katsumi Adachi, Asago (JP)

(73) Assignee: Tacmina Corporation, Osaka (JP)

( * ) Notice: Subject to any disclaimer, the term of this patent is extended or adjusted under 35 U.S.C. 154(b) by 33 days.

(21) Appl. No.: 14/125,679

(22) PCT Filed: Jun. 29, 2012

(86) PCT No.: PCT/JP2012/066685
§ 371 (c)(1),
(2), (4) Date: Dec. 12, 2013

(87) PCT Pub. No.: WO2013/005669
PCT Pub. Date: Jan. 10, 2013

(65) Prior Publication Data
US 2014/0119952 A1   May 1, 2014

(30) Foreign Application Priority Data
Jul. 1, 2011   (JP) .................................. 2011-147043

(51) Int. Cl.
*F04B 43/02*   (2006.01)
*F16K 15/02*   (2006.01)
(Continued)

(52) U.S. Cl.
CPC .............. *F04B 43/02* (2013.01); *F04B 13/02* (2013.01); *F04B 19/24* (2013.01); *F04B 43/021* (2013.01);
(Continued)

(58) Field of Classification Search
CPC ......... Y10T 137/7847; Y10T 137/7848; Y10T 137/7849; F04B 53/1087; F04B 45/04;
(Continued)

(56) References Cited

U.S. PATENT DOCUMENTS 2,682,281 A * 6/1954 Ecker ..................... F16K 15/04
                                                                137/533.13
3,298,319 A * 1/1967 Savage ................... F04B 43/02
                                                                137/242
(Continued)

FOREIGN PATENT DOCUMENTS

DE   102010039974 A1   3/2012
EP        1106584 A2   6/2001
(Continued)

OTHER PUBLICATIONS

European Search Report dated Mar. 2, 2015 issued in connection with related European Patent Application No. 12807322.8.
(Continued)

*Primary Examiner* — Bryan Lettman
(74) *Attorney, Agent, or Firm* — Brooks Kushman PC

(57) ABSTRACT

A pump is provided having a communication portion that provides continuous communication between a pump section and a discharge section in a state where a discharge-side check valve suppresses a backflow, and a size of the communication portion is set so that, when the continuously expanding and contracting pump section contracts, a volume of gas mixed in liquid in the pump section is contracted.

8 Claims, 21 Drawing Sheets

(51) Int. Cl.

| | | |
|---|---|---|
| *F16K 15/04* | (2006.01) | |
| *F04B 53/10* | (2006.01) | |
| *F16K 27/02* | (2006.01) | |
| *F16K 1/14* | (2006.01) | |
| *F16K 39/02* | (2006.01) | |
| *F04B 53/06* | (2006.01) | |
| *F04B 13/02* | (2006.01) | |
| *F04B 19/24* | (2006.01) | |

(52) U.S. Cl.
CPC .......... *F04B 53/06* (2013.01); *F04B 53/1002* (2013.01); *F04B 53/1005* (2013.01); *F04B 53/1087* (2013.01); *F16K 1/14* (2013.01); *F16K 15/021* (2013.01); *F16K 15/04* (2013.01); *F16K 27/0245* (2013.01); *F16K 39/022* (2013.01)

(58) Field of Classification Search
CPC .. F04B 53/1002; F04B 53/1005; F04B 43/02; F16K 1/14; F16K 15/021; F16K 15/04; F16K 27/0245; F16K 39/02; F16K 39/022
See application file for complete search history.

(56) References Cited

U.S. PATENT DOCUMENTS

| | | | |
|---|---|---|---|
| 3,901,475 A | 8/1975 | Dreibelbis | |
| 4,684,334 A * | 8/1987 | Gargas | B05B 9/0413 |
| | | | 137/512.3 |
| 6,685,451 B1 * | 2/2004 | Ivey | F04B 47/02 |
| | | | 137/533.19 |
| 7,237,569 B2 * | 7/2007 | Shieh | F16K 15/04 |
| | | | 137/533.13 |
| 7,444,990 B1 | 11/2008 | Fisher et al. | |
| 7,686,595 B1 * | 3/2010 | Graham | F04B 13/00 |
| | | | 417/413.1 |
| 2001/0050040 A1 * | 12/2001 | Shimizu | F04B 43/0054 |
| | | | 117/200 |
| 2003/0098016 A1 * | 5/2003 | Rembold | F02D 41/3854 |
| | | | 123/457 |
| 2010/0269928 A1 * | 10/2010 | Ford | F16K 15/04 |
| | | | 137/533.11 |

FOREIGN PATENT DOCUMENTS

| | | |
|---|---|---|
| EP | 1546557 B1 | 7/2008 |
| JP | 55-161065 U | 11/1980 |
| JP | 60-073875 U | 5/1985 |
| JP | 2001-073953 | 3/2001 |
| JP | 2001-336635 A | 12/2001 |
| JP | 2003-028327 | 1/2003 |
| JP | 2003-286941 | 10/2003 |
| JP | 2009-201933 | 9/2009 |
| JP | 2009-299484 | 12/2009 |
| JP | 2012-107559 A | 6/2012 |
| WO | WO2012051974 A2 | 4/2012 |
| WO | WO2013/135681 A1 | 9/2013 |

OTHER PUBLICATIONS

Office Action dated Mar. 14, 2004 in related Japanese Patent Application No. 2012-049289.

Schriever, et al.; Enzyklopadie Naturwissenschaft und Technik; 1981.

European Office Action dated Aug. 1, 2014 in connection with related European Patent Application No. 12807322.8.

International Preliminary Report on Patentability dated Jan. 16, 2014 in connection with related PCT Application No. PCT/JP2012/066685 and translation of same.

* cited by examiner

F I G . 1
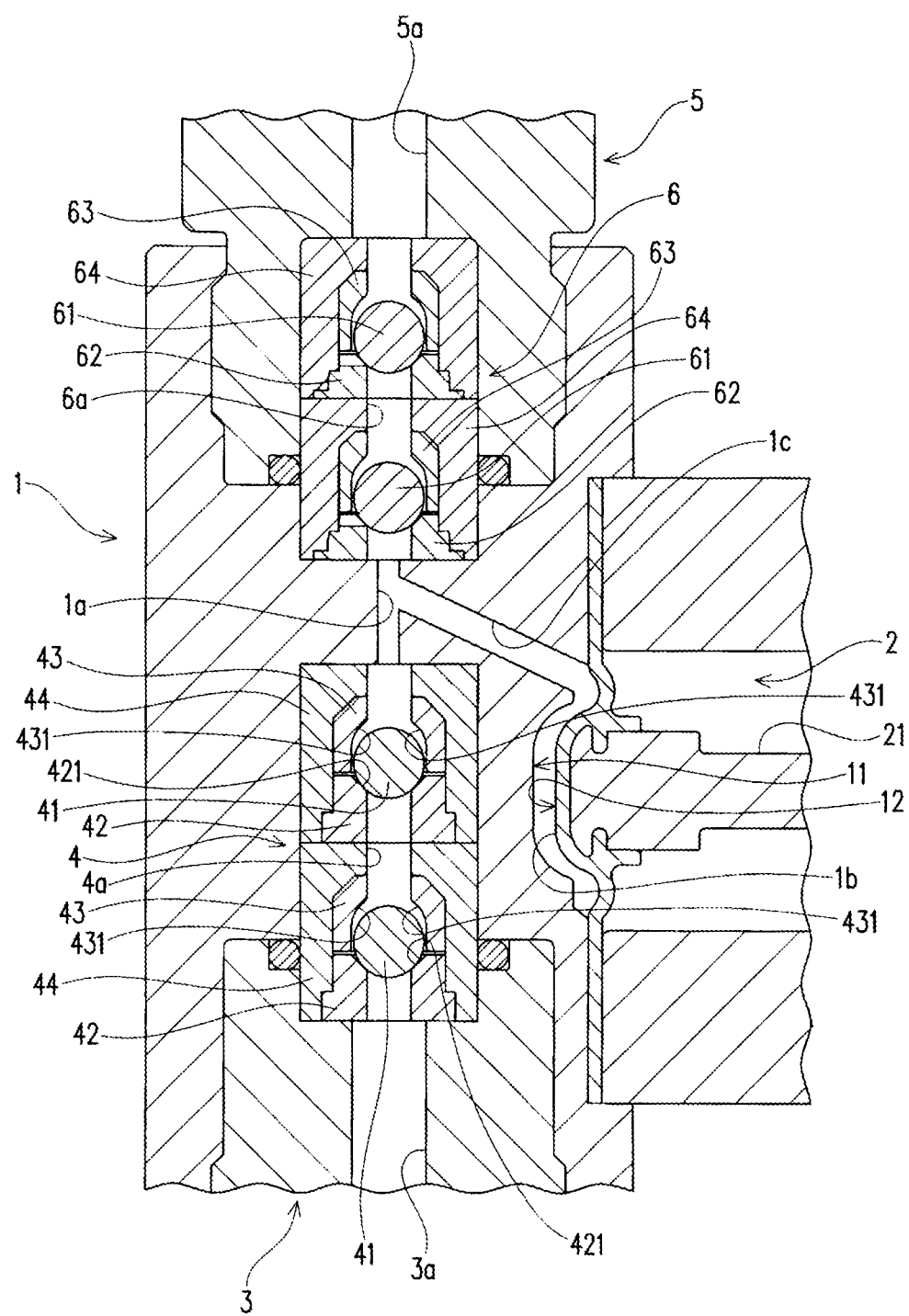

F I G . 10
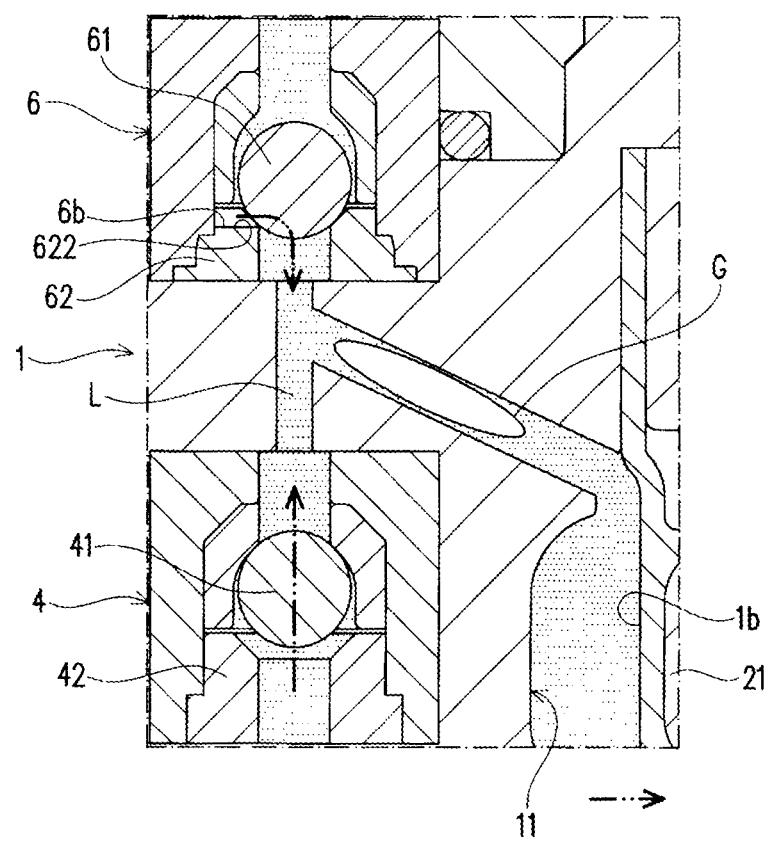

US 10,066,616 B2

PUMP AND METHOD FOR OPERATING PUMP

TECHNICAL FIELD

The present invention relates to a pump provided with a pump section that suctions liquid by expanding a capacity and discharges liquid by contracting the capacity and a method for operating a pump.

BACKGROUND ART

As a conventional pump, a pump provided with a pump section that suctions liquid by expanding a capacity and discharges liquid by contracting the capacity, a suction section that is connected to the pump section through a suctioning-side check valve in order to suction liquid into the pump section, and a discharge section that is connected to the pump section through a discharge-side check valve in order to discharge liquid from the pump section is known (Patent Literature 1, for example).

According to such pump, as the pump section expands the capacity, liquid is suctioned into the pump section from the suction section, while as the pump section contracts the capacity, liquid is discharged to the discharge section from the pump section. By repeating such operation, liquid is continuously fed from the suction section to the discharge section.

CITATION LIST

Patent Literature

Patent Literature 1: JP 2009-299484 A

In the pump according to Patent Literature 1, when the pump section expands the capacity and liquid is suctioned into the pump section from the suction section, gas may be mixed in liquid in the pump section. In such state, since the pump section communicates only with the suction section, pressures of liquid and gas in the pump section are equal to a pressure in the suction section.

After that, as the pump section contracts the capacity, when the pressures of liquid and gas of the pump section rise to a pressure of the discharge section which is a pressure higher than the pressure of the suction section, the pump section communicates with the discharge section. Then, due to such change in the pressure, a volume of gas mixed in liquid changes to be reduced, and gas may not be fed to the discharge section but remain in the pump section. When the pump comes into such state, liquid cannot be reliably fed from the suction section to the discharge section.

Moreover, in a case where gas keeps on remaining gradually in liquid in the pump section or where a large quantity of gas is mixed in liquid in the pump section at once, as the pump section expands or contracts the capacity, the pump may come into a state in which the volume of gas mixed in liquid of the pump section simply expands or contracts, that is, a so-called gas lock state. In a case where the pump comes into such gas lock state, the pump cannot feed liquid from the suction section to the discharge section at all.

SUMMARY OF INVENTION

Technical Problem

In view of the above circumstances, an object of the present invention is to provide a pump which can reliably feed liquid from the suction section to the discharge section even if gas is mixed in liquid in the pump section and a method for operating a pump.

Solution to Problem

According to the present invention, there is provided a pump including: a pump section that suctions liquid by expanding a capacity and discharges liquid by contracting the capacity; a suction section for suctioning liquid into the pump section; a discharge section for discharging liquid from the pump section; a suctioning-side check valve that suppresses a backflow of liquid from the pump section to the suction section; a discharge-side check valve that suppresses a backflow of liquid from the discharge section to the pump section; and a communication portion that provides continuous communication between the pump section and the discharge section in a state in which the discharge-side check valve suppresses the backflow, wherein a size of the communication portion is set so that, when the continuously expanding and contracting pump section contracts, a volume of gas mixed in liquid in the pump section is contracted.

Moreover, the pump according to the present invention may have a configuration in which the communication portion is provided on the discharge-side check valve; the discharge-side check valve is arranged on an upper side of the suctioning-side check valve; and the pump section is provided with: a first channel having a fixed capacity with an upper end portion connected to the discharge-side check valve and a lower end portion connected to the suctioning-side check valve; a pump chamber that expands and contracts the capacity; and a second channel having a fixed capacity with one end portion connected to the first channel and the other end portion connected to the pump chamber.

Moreover, the pump according to the present invention may have a configuration in which the second channel has an upper end portion connected to the first channel and a lower end portion connected to the pump chamber.

Moreover, the pump according to the present invention may have a configuration in which the discharge-side check valve is provided with: a valve element that moves inside a flow portion through which liquid is made to flow; and a valve seat that is brought into contact with the valve element so as to suppress a backflow of liquid from the discharge section to the pump section; and the valve seat is provided with a recessed portion so that the communication portion is formed in a gap between the valve seat and the valve element.

Moreover, the pump according to the present invention may have a configuration in which the contact portion is formed so that a surface has a tapered surface shape; and the recessed portion is extended along the surface of the contact portion.

Moreover, the pump according to the present invention may have a configuration in which the contact portion is formed to have its surface formed into a tapered surface shape; and the recessed portion is extended along a radial direction.

Moreover, the pump according to the present invention may have a configuration in which the discharge-side check valve is provided with: a valve element that moves inside a flow portion through which liquid is made to flow; and a valve seat that is brought into contact with the valve element so as to suppress a backflow of liquid from the discharge section to the pump section; and the valve seat is provided with a projecting portion so that the communication portion is formed in a gap between the valve seat and the valve element.

Moreover, according to the present invention, there is provided a method for operating a pump using a pump provided with: a pump section that suctions liquid by expanding a capacity and discharges liquid by contracting the capacity; a suction section for suctioning liquid into the pump section; a discharge section for discharging liquid from the pump section; a suctioning-side check valve that suppresses a backflow of liquid from the pump section to the suction section; a discharge-side check valve that suppresses a backflow of liquid from the discharge section to the pump section; and a communication portion that provides continuous communication between the pump section and the discharge section in a state in which the pump section suctions liquid, including: expanding a capacity of the pump section so that liquid is suctioned from the suction section into the pump section; allowing liquid to flow from the discharge section into the pump section via the communication portion so that a volume of gas mixed in liquid in the pump section is contracted; and contracting the capacity of the pump section so that gas of which volume has been contracted is discharged from the pump section to the discharge section together with liquid.

BRIEF DESCRIPTION OF DRAWINGS

FIG. 1 illustrates a sectional view of an essential part of a pump according to an embodiment of the present invention.

FIG. 10 illustrates a sectional view of the essential part for explaining the operation of the pump according to the embodiment.

DESCRIPTION OF EMBODIMENTS

Figure 2:
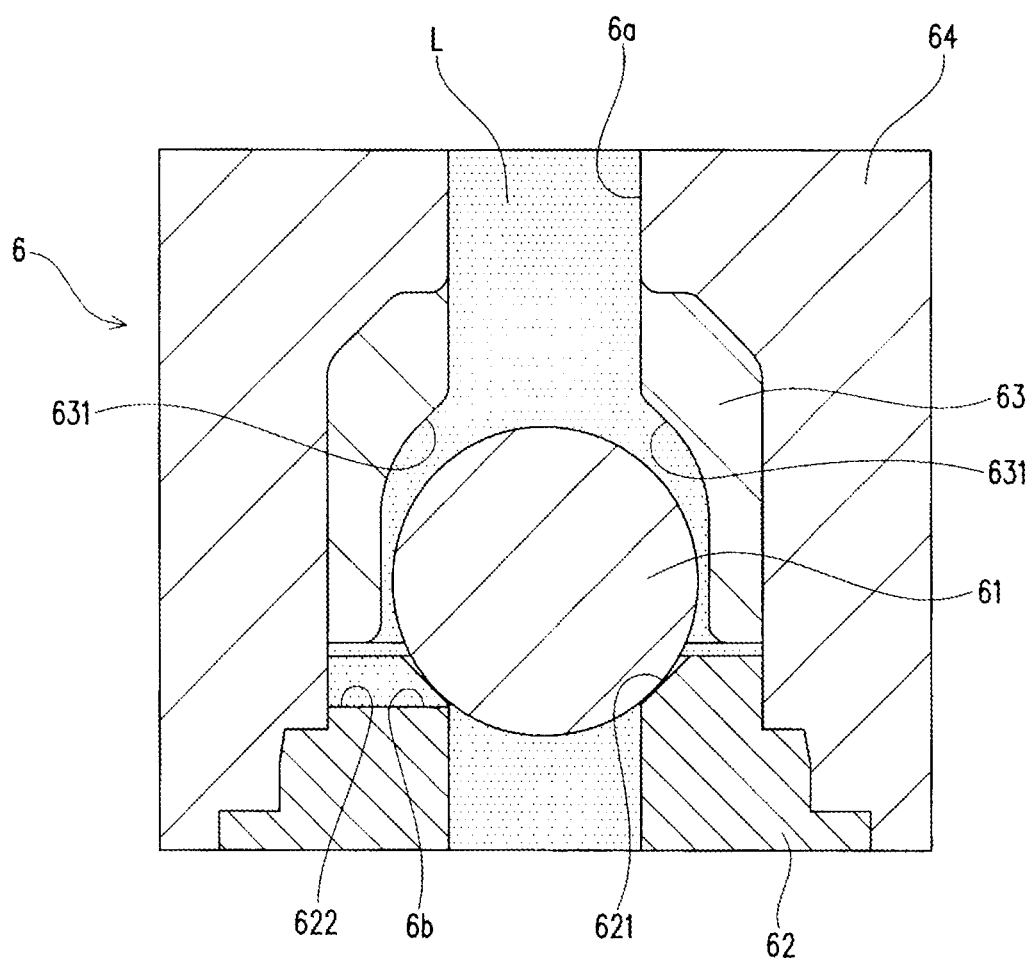
FIG. 2 illustrates a sectional view of an essential part of a discharge-side check valve according to the embodiment.

An embodiment in a pump according to the present invention is described below with reference to FIG. 1 to FIG. 12.

The pump according to this embodiment is, as illustrated in FIG. 1, provided with a pump section 1 for suctioning and discharging liquid L and a drive section 2 for driving the pump section 1. The pump is provided with a suction section 3 for suctioning liquid L into the pump section 1 and a suctioning-side check valve 4 for suppressing a backflow (flowing) of liquid L from the pump section 1 to the suction section 3.

Moreover, the pump is provided with a discharge section 5 for discharging liquid L from the pump section 1 and a discharge-side check valve 6 for suppressing a backflow (flowing) of liquid L from the discharge section 5 to the pump section 1. In the pump, a pressure of liquid L in the discharge section 5 is set so as to be larger than a pressure of the suction section 3.

The pump sections 1 is provided with a movable portion 12 movable with respect to a body 11 and a fixing portion 13 for fixing a portion of the movable portion 12 to the body 11. In this embodiment, the movable portion 12 is a circular diaphragm having elasticity. Since the body 11 and the fixing portion 13 sandwich an outer periphery of the movable portion 12, a center portion of the movable portion 12 is made movable so as to contact and separate from the body 11.

Moreover, the pump section 1 is provided with a channel through which liquid L is made to flow. Specifically, the pump section 1 is provided with a first channel 1a having a fixed capacity for connecting the suctioning-side check valve 4 and the discharge-side check valve 6, a pump chamber 1b for changing a capacity by means of movement of the movable portion 12, and a second channel 1c having a fixed capacity for connecting the first channel 1a and the pump chamber 1b. The pump section 1 suctions liquid L from a lower side of the first channel 1a by expanding the capacity of the pump chamber 1b and discharges liquid L from an upper side of the first channel 1*a* by contracting the capacity of the pump chamber 1*b*.

The drive section 2 is provided with a shaft 21 connecting a tip end portion to a center portion of the movable portion 12 and a driving source (not shown) 22 for reciprocally moving the shaft 21 so as to move (reciprocally move) the center portion of the movable portion 12. A type of the driving source 22 is not limited to a specific one but may be any of a mechanical type, an air type, a hydraulic type, an electric type, a magnet type and the like, and moreover it may be direct or indirect.

The suctioning-side check valve 4 is provided with valve elements 41 and 41 that is movable in a flow portion 4*a* through which liquid L is made to flow and valve seats 42 and 42 that are brought into contact with the valve elements 41 so as to suppress a backflow of liquid L from the suction section 3 to the pump section 1. The suctioning-side check valve 4 is provided with regulating portions 43 and 43 each for preventing the valve element 41 from moving by a predetermined amount or more and base portions 44 and 44 each for fixing the valve seat 42 and the regulating portion 43 therein and accommodating the valve element 41 between the valve seat 42 and the regulating portion 43.

That is, the suctioning-side check valve 4 has a configuration provided with two valve units, each composed of the valve element 41 and the valve seat 42. Moreover, the suctioning-side check valve 4 is arranged between the pump section 1 and the suction section 3. The flow portion 4*a* of the suctioning-side check valve 4 has an upper end portion connected to a lower end portion of the first channel 1*a* of the pump section 1 and a lower end portion connected to an upper end portion of a flow portion 3*a* of the suction section 3.

Moreover, in the suctioning-side check valve 4, the valve element 41 is formed into a spherical shape. The valve seat 42 is provided with a contact portion 421 formed having a tapered surface shape corresponding to the valve element 41 so as to close the flow portion 4*a* by being brought into contact with the valve element 41. Therefore, the suctioning-side check valve 4 has a configuration of fully shutting off a backflow of liquid L from the pump section 1 to the suction section 3 in a state in which the valve element 41 is held in contact with the valve seat 42.

Moreover, in the suctioning-side check valve 4, the regulating portion 43 is provided with a plurality of stopper portions 431 protruding inward in order to hold or lock the valve element 41 thereon. The plurality of stopper portions 431 are arranged separately from each other so as to form the flow portion 4*a*. Therefore, the suctioning-side check valve 4 has a configuration allowing liquid L to flow from the suction section 3 into the pump section 1 in a state in which the valve element 41 is held or locked by the regulating portion 43.

Figure 3:
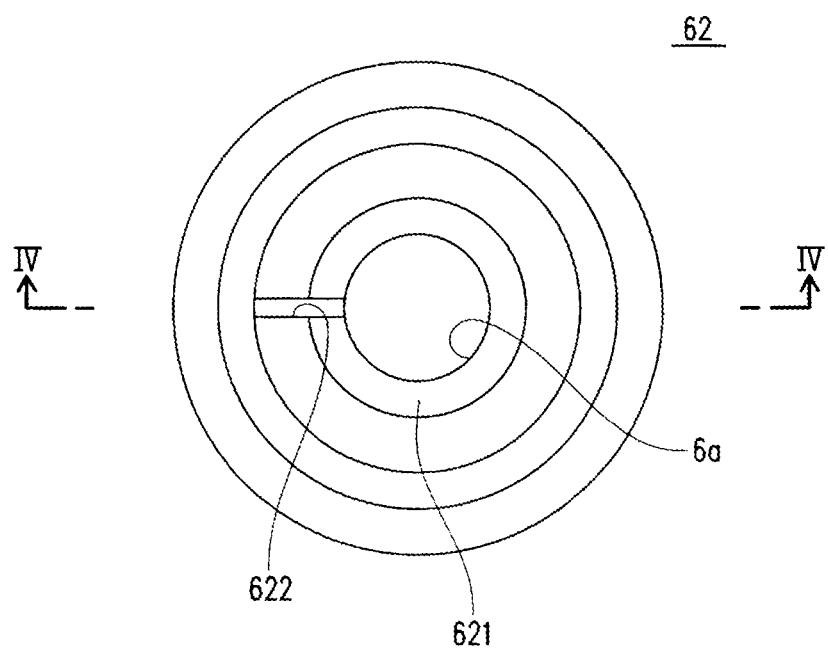
FIG. 3 illustrates a whole plan view of a valve seat in the discharge-side check valve according to the embodiment.
Figure 4:
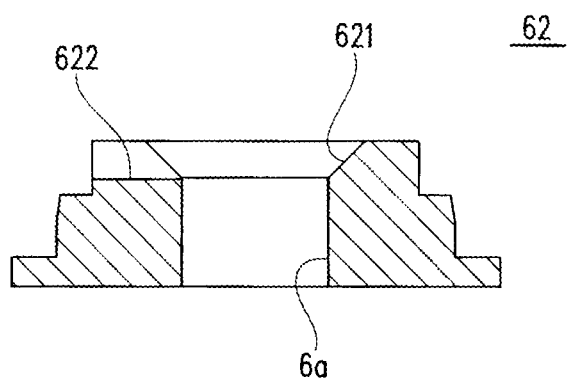
FIG. 4 is a whole view of the valve seat in the discharge-side check valve according to the embodiment and illustrates a sectional view taken along an IV-IV line in FIG. 3.

The discharge-side check valve 6 is, as illustrated in FIG. 2 to FIG. 4, provided with valve elements 61 and 61 that are movable in a flow portion 6*a* through which liquid L is made to flow and valve seats 62 and 62 that are brought into contact with the valve elements 61 so as to suppress a backflow of liquid L from the discharge section 5 to the pump section 1. The discharge-side check valve 6 is provided with regulating portions 63 and 63 each for preventing the valve element 61 from moving by a predetermined amount or more and base portions 64 and 64 each for fixing the valve seat 62 and the regulating portion 63 therein and accommodating the valve element 61 between the valve seat 62 and the regulating portion 63.

That is, the discharge-side check valve 6 has a configuration provided with two valve units, each composed of the valve element 61 and the valve seat 62. Moreover, the discharge-side check valve 6 is arranged between the pump section 1 and the discharge section 5. The flow portion 6*a* of the discharge-side check valve 6 has a lower end portion connected to the upper end portion of the first channel 1*a* of the pump section 1 and an upper end portion connected to a lower end portion of a flow portion 5*a* of the discharge section 5.

Moreover, in the discharge-side check valve 6, the valve element 61 is formed into a spherical shape. The valve seat 62 is provided with a contact portion 621 formed having a tapered surface shape corresponding to the valve element 61 so as to be brought into contact with the valve element 61. In addition, the valve seat 62 of the discharge-side check valve 6 is provided with a recessed portion 622 extending in a radial direction so as to form a gap between itself and the valve element 61 even in a state in which the valve element 61 is held in contact with the contact portion 621.

As a result, in the discharge-side check valve 6, in a state in which the pump section 1 has suctioned liquid L, a communication portion 6*b* for providing communication between the pump section 1 and the discharge section 5 is formed. Specifically, the communication portion 6*b* is formed by a gap between an outer surface of the valve element 61 and the recessed portion 622 of the valve seat 62 even if the valve element 61 is held in contact with the contact portion 621 of the valve seat 62 and allows the pump section 1 and the discharge section 5 to continuously communicate with each other. Therefore, the discharge-side check valve 6 has a configuration in which a backflow of liquid L from the discharge section 5 to the pump section 1 is not fully shut off in the state in which the valve element 61 is held in contact with the valve seat 62.

The size of the communication portion 6*b* is set so that, as the capacity of the pump section 1 expands, liquid L is suctioned from the suction section 3 into the pump section 1. That is, when an opening of the communication portion 6*b* is set larger than a predetermined size, liquid L is not suctioned from the suction section 3 into the pump section 1 as the capacity of the pump section 1 expands (liquid L is suctioned to the pump section 1 only from the communication portion 6*b*), and thus, the communication portion 6*b* is set to a predetermined size in order to prevent such phenomenon from occurring.

Specifically, an effective sectional area of the communication portion 6*b* (a value obtained by dividing a flow rate of liquid L by a flow velocity of liquid L) is smaller than an effective sectional area of the flow portion 3*a* of the suction section 3 or an effective sectional area of the flow portion 4*a* of the suctioning-side check valve 4. More specifically, the effective sectional area of the communication portion 6*b* is preferably 5% or less of an effective sectional area of the smaller of the effective sectional area of the flow portion 3*a* of the suction section 3 and the flow portion 4*a* of the suctioning-side check valve 4.

Moreover, in the discharge-side check valve 6, the regulating portion 63 is provided with a plurality of stopper portions 631 protruding inward in order to hold or lock the valve element 61 thereon. The plurality of stopper portions 631 are arranged separately from each other so as to form the flow portion 6*a*. Therefore, the discharge-side check valve 6 has a configuration allowing liquid L to flow from the pump section 1 to the discharge section 5 in a state in which the valve element 61 is held or locked by the regulating portion 63.

The configuration of the pump according to this embodiment is as described above. Subsequently, before describing an operation of the pump according to this embodiment, an operation of a pump of a comparative example which has a configuration not provided with the communication portion 6b (the recessed portion 622 of the valve seat 62 of the discharge-side check valve 6) is described with reference to FIG. 5 to FIG. 8.

The pump of such comparative example is different from the configuration of the pump according to this embodiment only by a configuration of a valve seat 62' of a discharge-side check valve 6'. Specifically, in the pump of the comparative example, when the valve element 61 is brought into contact with a contact portion 621' of the valve seat 62' of the discharge-side check valve 6', the flow portion 6a is closed and a backflow of liquid L from the discharge section 5 to the pump section 1 is fully shut off. In FIG. 5 to FIG. 8, the portions given the same reference numerals as those in FIG. 1 to FIG. 4 are the same configurations or elements of the pump according to this embodiment.

Figure 5:
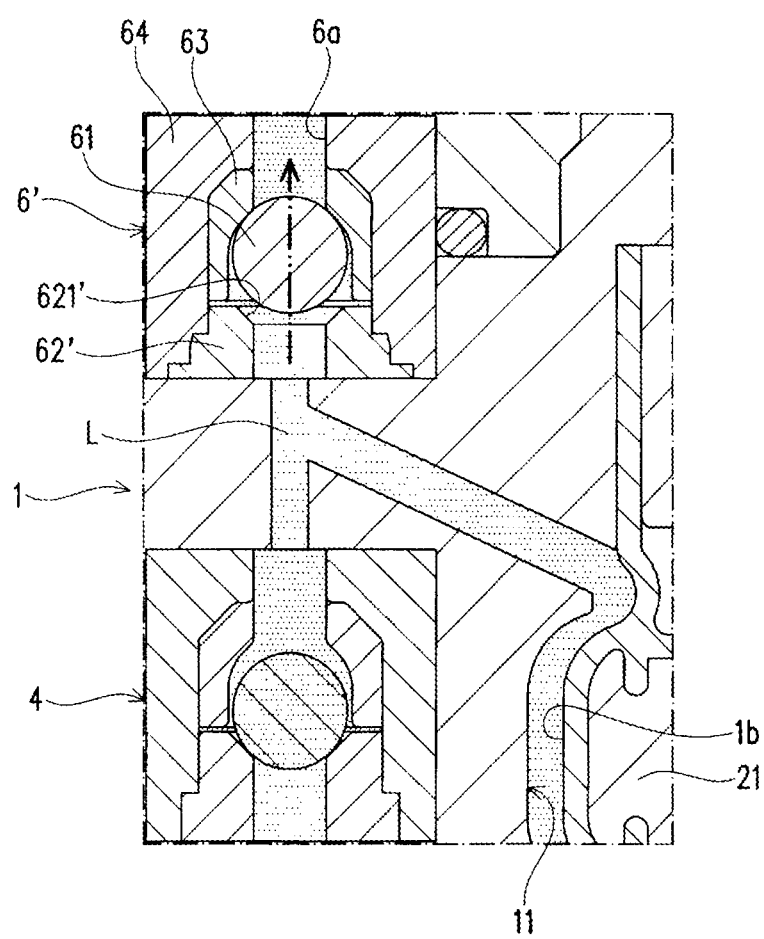
FIG. 5 illustrates a sectional view of an essential part for explaining an operation of a pump of a comparative example with respect to the pump according to the embodiment.
Figure 6:
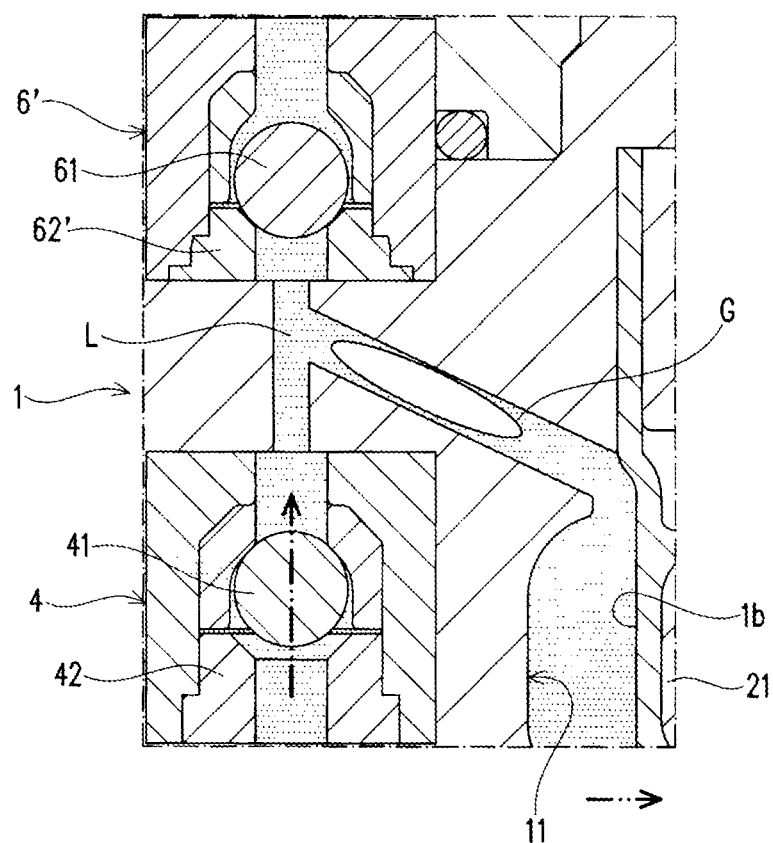
FIG. 6 illustrates a sectional view of the essential part for explaining the operation of the pump of the comparative example.

First, as illustrated in FIG. 5, after liquid L is discharged from the pump section 1 to the discharge section 5 via the discharge-side check valve 6', as illustrated in FIG. 6, when the shaft 21 moves to one side so as to separate from the body 11, the capacity of the pump chamber 1b of the pump section 1 expands. Then, a pressure in the pump chamber 1b becomes negative, and thus, the valve element 61 of the discharge-side check valve 6' is brought into contact with the valve seat 62', the discharge-side check valve 6' is closed, the valve element 41 of the suctioning-side check valve 4 separates from the valve seat 42, and the suctioning-side check valve 4 is opened.

Figure 7:
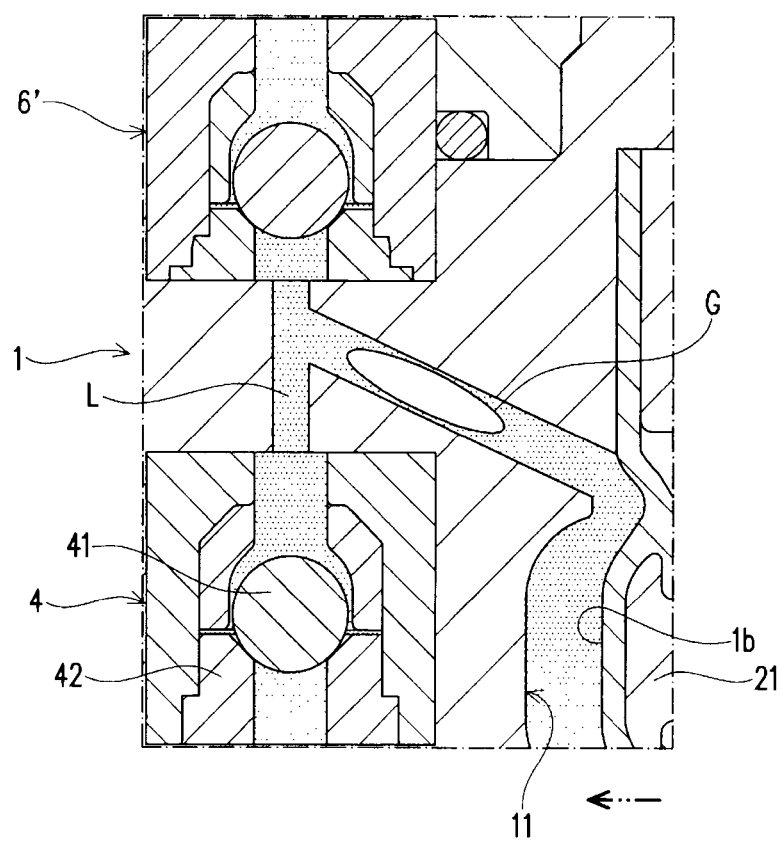
FIG. 7 illustrates a sectional view of the essential part for explaining the operation of the pump of the comparative example.

As a result, liquid L is suctioned into the pump section 1 from the suction section 3 via the suctioning-side check valve 4, and the pressure of liquid L in the pump section 1 becomes equal to the pressure of liquid L in the suction section 3. At this time, assume that gas G is mixed in liquid L in the pump section 1. After that, as illustrated in FIG. 7, when the shaft 21 moves to an opposite side so as to come close to the body 11, the capacity of the pump chamber 1b of the pump section 1 contracts.

Then, since the pressures of liquid L and gas G in the pump section 1 rise, the volume of gas G mixed in liquid L in the pump section 1 contracts. Since the pressures of liquid L and gas G in the pump section 1 becomes higher than the pressure of liquid L in the suction section 3, the valve element 41 of the suctioning-side check valve 4 is brought into contact with the valve seat 42, and the suctioning-side check valve 4 is closed. However, since the pressures of liquid L and gas G in the pump section 1 are lower than the pressure of the discharge section 5, the discharge-side check valve 6' is kept closed.

Figure 8:
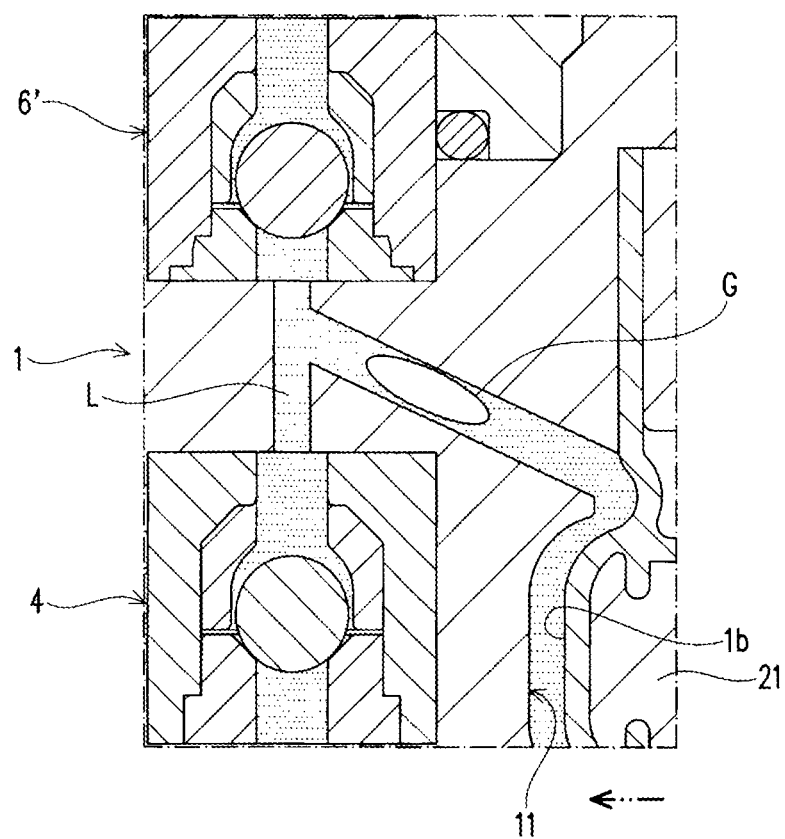
FIG. 8 illustrates a sectional view of the essential part for explaining the operation of the pump of the comparative example.

As illustrated in FIG. 8, when the shaft 21 further moves to the opposite side so as to come close to the body 11, the capacity of the pump chamber 1b of the pump section 1 further contracts. With that, the pressures of liquid L and gas G in the pump section 1 rise, and thus, the volume of gas G mixed in liquid L in the pump section 1 also contracts. However, since the pressures of liquid L and gas G in the pump section 1 are still lower than the pressure of the discharge section 5, the discharge-side check valve 6' is kept closed.

In such state, even when the shaft 21 repeats reciprocal motion, as the pump section 1 expands or contracts the capacity, the pump comes into a state in which the volume of gas G mixed in liquid L in the pump section 1 simply expands or contracts, that is, a so-called gas lock state. If the pump comes into such gas lock state, liquid L is not fed from the suction section 3 to the discharge section 5 at all.

Figure 9:
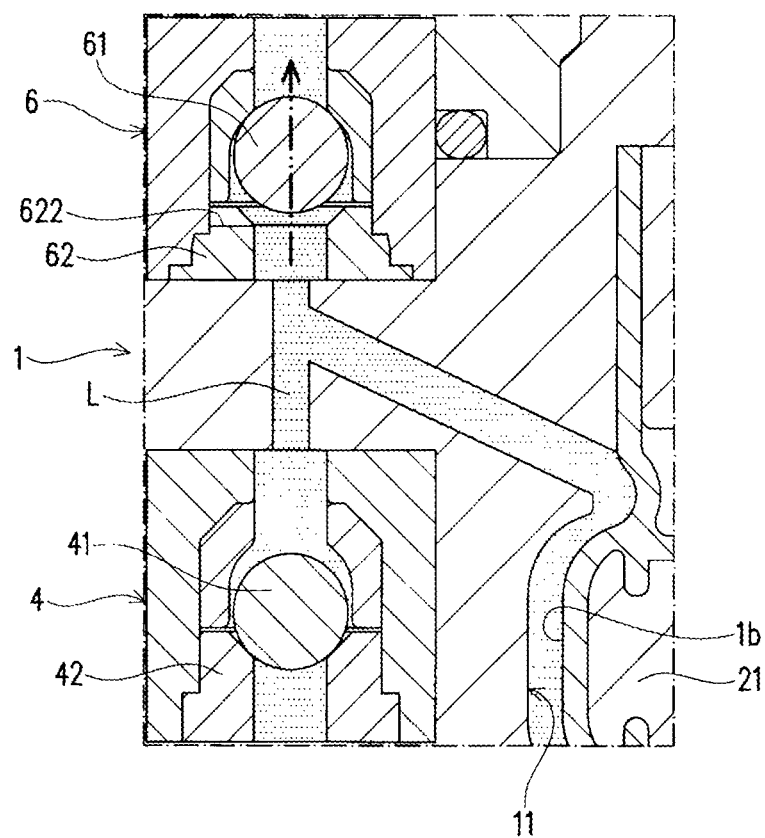
FIG. 9 illustrates a sectional view of the essential part for explaining the operation of the pump according to the embodiment.

Subsequently, an operation of the pump according to this embodiment is described with reference to FIG. 9 to FIG. 12. First, as illustrated in FIG. 9, after liquid L is discharged from the pump section 1 to the discharge section 5 via the discharge-side check valve 6, as illustrated in FIG. 10, the shaft 21 moves to one side so as to separate from the body 11. Then, since the capacity of the pump chamber 1b of the pump section 1 expands, the pressure in the pump chamber 1b becomes negative. As a result, the valve element 61 of the discharge-side check valve 6 is brought into contact with the valve seat 62, and the valve element 41 of the suctioning-side check valve 4 separates from the valve seat 42, and the valve element 41 of the suctioning-side check valve 4 is opened.

As a result, liquid L is suctioned into the pump section 1 from the suction section 3 via the suctioning-side check valve 4. Assume that gas G is mixed in liquid L in the pump section 1 at this time. In the discharge-side check valve 6, the valve element 61 is brought into contact with the valve seat 62, while the communication portion 6b formed by a gap between the outer surface of the valve element 61 and the recessed portion 622 of the valve seat 62 provides communication between the pump section 1 and the discharge section 5, and thus, liquid L is made to flow into the pump section 1 from the discharge section 5 in a slight amount via the communication portion 6b.

Figure 11:
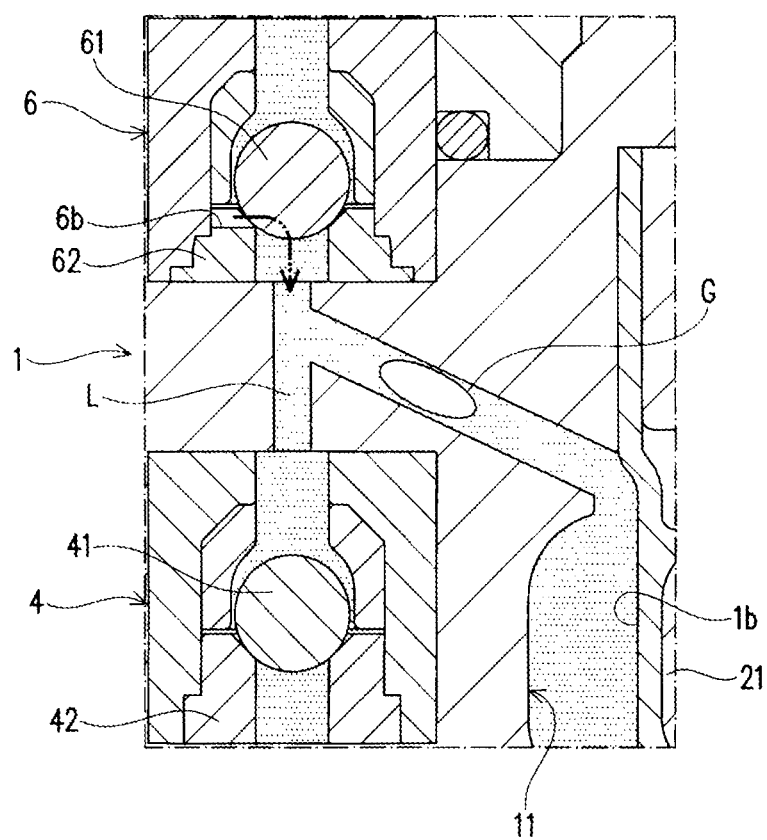
FIG. 11 illustrates a sectional view of the essential part for explaining the operation of the pump according to the embodiment.

With that, since the pressures of liquid L and gas G in the pump section 1 rise so as to come close from the pressure of liquid L in the suction section 3 to the pressure of liquid L in the discharge section 5, as illustrated in FIG. 11, the valve element 41 of the suctioning-side check valve 4 is brought into contact with the valve seat 42, the suctioning-side check valve 4 is closed, and the volume of gas G mixed in liquid L in the pump section 1 contracts. Liquid L is made to flow into the pump section 1 from the discharge sections 5 via the communication portion 6b until the pressures of liquid L and gas G in the pump section 1 become equal to the pressure of liquid L in the discharge section 5 in the end.

Figure 12:
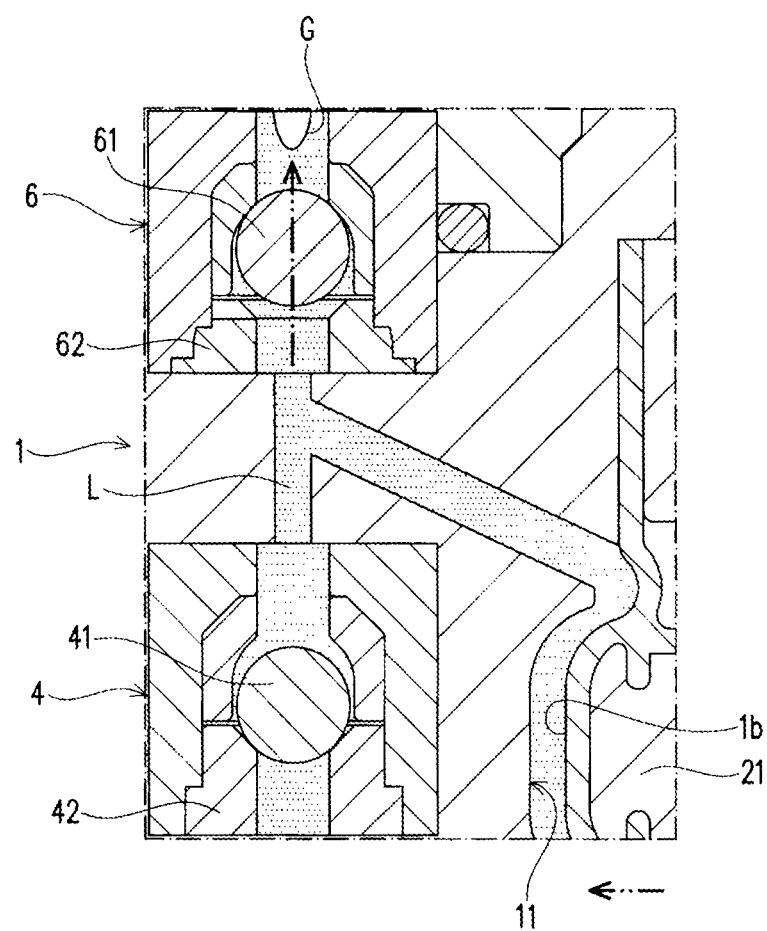
FIG. 12 illustrates a sectional view of the essential part for explaining the operation of the pump according to the embodiment.

After that, since the pressures of liquid L and gas G in the pump section 1 have risen to the pressure of liquid L in the discharge section 5, as illustrated in FIG. 12, as the shaft 21 moves to the opposite side so as to get close to the body 11, the capacity of the pump chamber 1b of the pump section 1 contracts, the valve element 61 of the discharge-side check valve 6 separates from the valve seat 62, and the discharge-side check valve 6 is opened. Since the pressures of liquid L and gas G in the pump section 1 are equal to the pressure of the discharge section 5 and constant without a change, the volume of gas G mixed in liquid L is also constant without a change.

As a result, gas G mixed in liquid L in the pump section 1 is fed to the discharge section 5 together with liquid L via the discharge-side check valve 6. Since the shaft 21 repeats a reciprocal motion, the pump section 1 repeats expansion and contraction of the capacity, and thus, liquid L is continuously fed to the discharge section 5 from the suction section 3.

As described above, according to the pump of this embodiment, when the pump section 1 expands the capacity, liquid L is suctioned into the pump section 1 from the suction section 3. Since the communication portion 6b provides communication between the pump section 1 and the discharge section 5 in a state in which the pump section 1 has suctioned liquid L, the pressure of liquid L in the pump section 1 becomes equal to the pressure of liquid L in the discharge section 5. After that, when the pump section 1 contracts the capacity, liquid L is discharged from the pump section 1 to the discharge section 5.

At this time, in a case where gas G is mixed in liquid L in the pump section 1, even if the pump section 1 contracts the capacity, the pressures of liquid L and gas G in the pump section 1 are kept constant without a change to be caused by the pressure of liquid L in the discharge section 5, and thus, the volume of gas G does not change, either, but is made constant. As a result, gas G mixed in liquid L in the pump section 1 is fed to the discharge section 5 together with liquid L, and thus, liquid L is reliably fed to the discharge section 5 from the suction section 3.

Moreover, according to the pump of this embodiment, the communication portion 6*b* provides continuous communication between the pump section 1 and the discharge section 5. Since the communication portion 6*b* is set to a predetermined size, as the pump section 1 expands the capacity, liquid L is made to flow into the pump section 1 from the discharge section 5 via the communication portion 6*b* in a slight amount, while liquid L is suctioned from the suction section 3 into the pump section 1. As a result, liquid L is reliably fed to the discharge section 5 from the suction section 3. Moreover, since the configuration of the communication portion 6*b* is simplified, a design of the device can be made flexibly.

Moreover, according to the pump of this embodiment, since the valve element 61 movable in the flow portion 6*a* is brought into contact with the valve seat 62 in the discharge-side check valve 6, a back flow of liquid L from the discharge section 5 to the pump section 1 can be suppressed. Since the recessed portion 622 is provided in the valve seat 62, the communication portion 6*b* is formed in a gap between the valve seat 62 and the valve element 61. As a result, at whatever position the valve element 61 is brought into contact with the valve seat 62, the communication portion 6*b* having the same size at any time is formed. Moreover, clogging of the communication portion 6*b* can be suppressed even against liquid L which can be easily solidified.

Moreover, according to the pump of this embodiment, since the valve element 61 has a spherical shape and moves inside the flow portion 6*a*, when the discharge-side check valve 6 is opened and closed, the valve element 61 is prevented from being brought into contact with the valve seat 62 at its fixed portion (same portion). As a result, wear of the valve element 61 at a predetermined portion can be suppressed.

Moreover, when the discharge-side check valve 6 is opened and closed, since the valve element 61 is brought into contact with the surface of the contact portion 621 of the valve seat 62, wear of the recessed portion 622 of the contact portion 621 can be prevented. Therefore, even when the opening and closing operation of the discharge-side check valve 6 is repeated, a change in the size of the communication portion 6*b* can be suppressed, and thus, the initial function of the communication portion 6*b* can be maintained.

Moreover, according to the pump of this embodiment, when gas G is mixed in liquid L in the pump section 1, gas G can be easily located on an upper end side of the first channel 1.*a*, that is, in the vicinity of the discharge-side check valve 6. Since the communication portion 6*b* is provided between the valve element 61 and the valve seat 62 of the discharge-side check valve 6, when liquid L is made to flow into the pump section 1 from the discharge section 5 via the communication portion 6*b*, the volume of gas G located in the vicinity of the discharge-side check valve 6 can be easily contracted without a delay from the inflow of liquid L.

Moreover, sine gas G is located in the vicinity of the discharge-side check valve 6, when the capacity of the pump chamber 1 is contracted, gas G can be easily discharged to the discharge section 5 from the pump section 1 together with liquid L. Therefore, even when gas G is mixed in liquid L in the pump section 1, since gas G mixed in liquid L in the pump section 1 is fed to the discharge section 5 together with liquid L, liquid L is reliably fed to the discharge section 5 from the suction section 3.

The pump according to the present invention is not limited to the aforementioned embodiment but it is needless to say that various changes can be applied within a scope not departing from the gist of the present invention. Moreover, it is also needless to say that configurations, methods and the like according to various modifications described below may be arbitrarily selected and employed for the configurations, methods and the like according to the aforementioned embodiment.

The pump according to the embodiment has a configuration in which the movable portion 12 is a diaphragm, that is, the pump is a diaphragm pump. However, the pump according to the present invention is not limited to such configuration. Specifically, the pump may be a plunger pump or a bellows pump. In summary, any pump may be used as long as it has a configuration provided with a pump section that suctions liquid L by expanding the capacity and discharges liquid L by contracting the capacity.

Moreover, the pump according to this embodiment has a configuration in which the discharge-side check valve 6 is provided with two valve units, each composed of the valve element 61 and the valve seat 62. However, the pump according to the present invention is not limited to such configuration. For example, in the pump according to the present invention, the discharge-side check valve 6 may have a configuration provided with one valve unit composed of the valve element 61 and the valve seat 62 or may have a configuration provided with three or more valve units.

Figure 13:
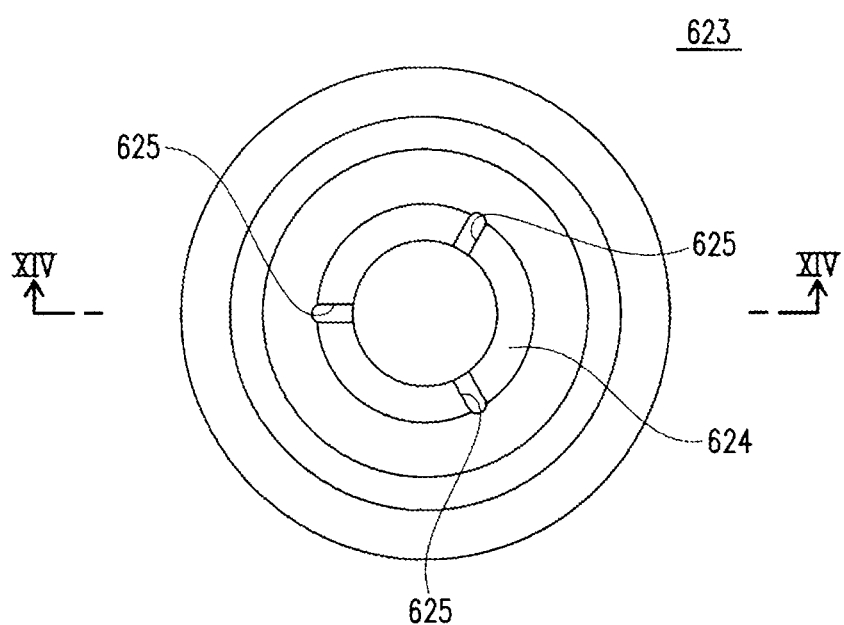
FIG. 13 illustrates a whole plan view of the valve seat in the discharge-side check valve according to another embodiment of the present invention.
Figure 14:
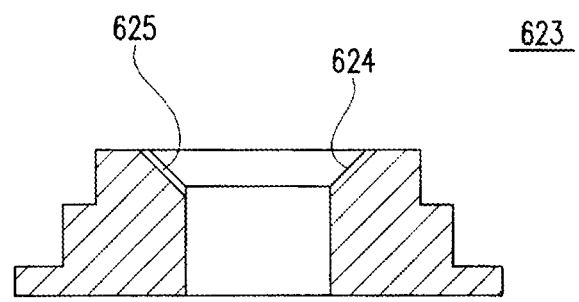
FIG. 14 is a whole view of the discharge-side check valve according to the embodiment and illustrates a sectional view taken along a XIV-XIV line in FIG. 13.

Moreover, the pump according to this embodiment has a configuration in which the recessed portion 622 extending along the radial direction is provided on the valve seat 62 of the discharge-side check valve 6. However, the pump according to the present invention is not limited to such configuration. For example, the pump according to the present invention may have a configuration, as illustrated in FIG. 13 and FIG. 14, provided with a recessed portion 625 extending along the surface of a tapered contact portion 624 on a valve seat 623 of the discharge-side check valve.

Moreover, the pump according to this embodiment has a configuration in which one recessed portion 622 is provided on the valve seat 62 of the discharge-side check valve 6. However, the pump according to the present invention is not limited to such configuration. For example, the pump according to the present invention may have a configuration, as illustrated in FIG. 13 and FIG. 14, provided with a plurality of (three in FIG. 13 and FIG. 14) the recessed portions 625 on the valve seat 623 of the discharge-side check valve.

Moreover, the pump according to this embodiment has a configuration in which the communication portion 6*b* is formed in a gap between the valve element 61 and the valve seat 62 by providing the recessed portion 622 on the valve seat 62 of the discharge-side check valve 6. However, the pump according to the present invention is not limited to such configuration. For example, the pump according to the present invention may have a configuration in which the communication portion is formed in a gap between the valve element 61 and the valve seat 62 by providing a projecting portion or a projecting-and-recessed portion (projecting portion and recessed portion) on the valve seat of the discharge-side check valve.

Moreover, the pump according to this embodiment has a configuration in which the recessed portion 622 is provided on the valve seat 62 of the discharge-side check valve 6. However, the pump according to the present invention is not limited to such configuration. For example, the pump according to the present invention may have a configuration in which the communication portion is formed in a gap between the valve element and the valve seat by providing at least either one of a recessed portion and a projecting portion on the valve element of the discharge-side check valve. Moreover, the pump according to the present invention may have a configuration in which the communication portion is formed in a gap between the valve element and the valve seat by providing at least either one of a recessed portion and a projecting portion on each of the valve element and the valve seat of the discharge-side check valve.

Moreover, the pump according to this embodiment has a configuration in which the valve element 61 of the discharge-side check valve 6 is formed into a spherical shape, that is, a configuration in which the discharge-side check valve 6 is a ball check valve. However, the pump according to the present invention is not limited to such configuration. For example, the discharge-side check valve of the pump according to the present invention may be a duckbill-type check valve and may have a configuration in which the communication portion is formed in a gap between the valve element and the valve seat.

Moreover, the pump according to this embodiment has a configuration in which the communication portion 6b is formed in a gap between the valve element 61 and the valve seat 62 of the discharge-side check valve 6. However, the pump according to the present invention is not limited to such configuration. For example, the pump according to the present invention may have a configuration, in which the communication portion is formed of at least either one of a gap between the valve seat and the base portion of the discharge-side check valve and a penetrating portion provided on the valve seat of the discharge-side check valve. An example of such configuration is illustrated in FIG. 15 to FIG. 17.

Figure 15:
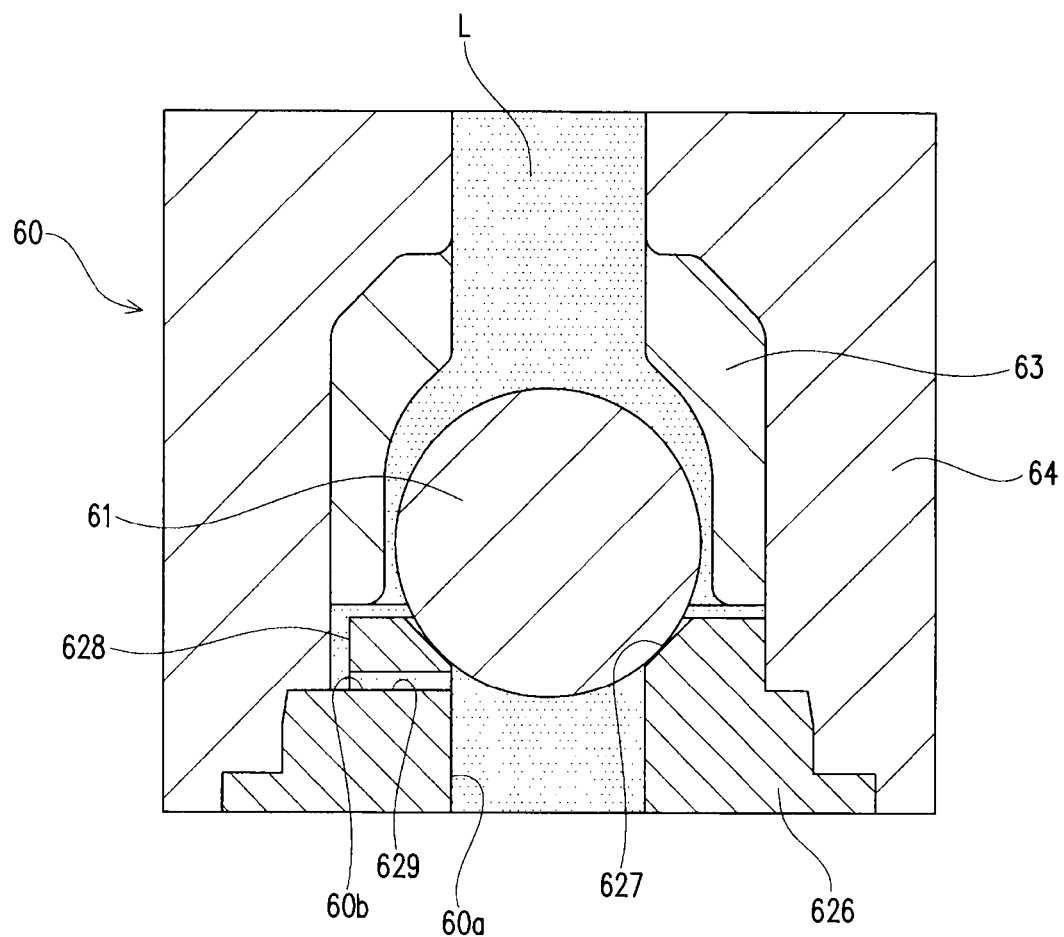
FIG. 15 illustrates a sectional view of the essential part of the discharge-side check valve according to still another embodiment of the present invention.
Figure 16:
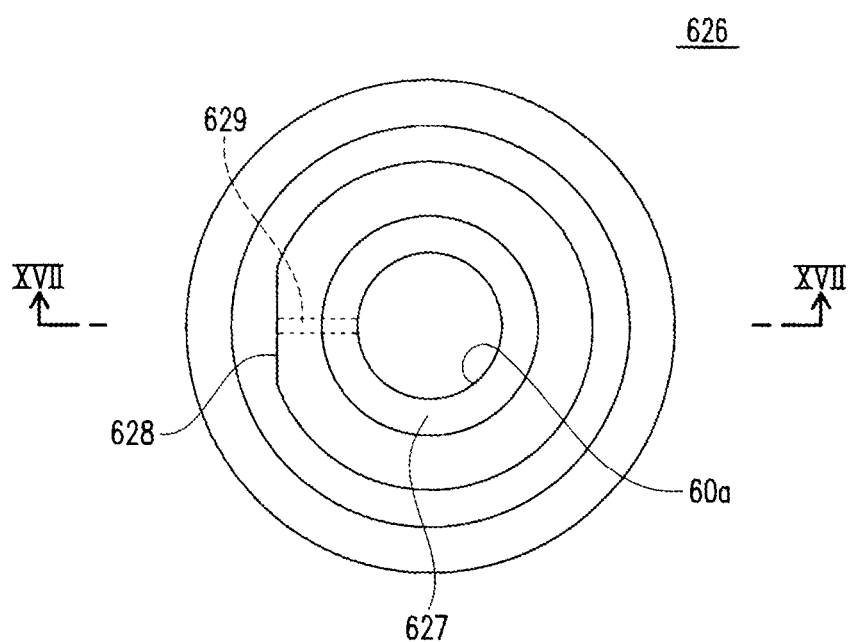
FIG. 16 illustrates a whole plan view of the valve seat in the discharge-side check valve according to the embodiment.
Figure 17:
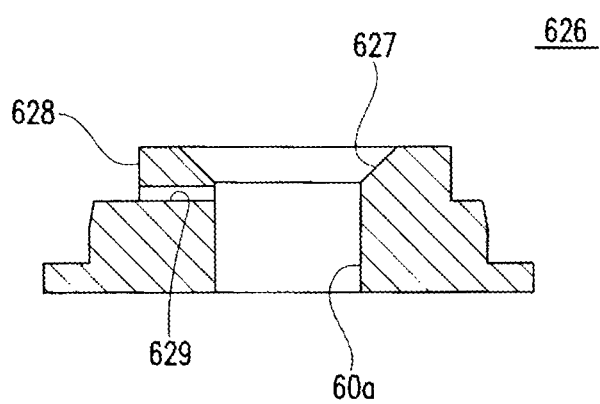
FIG. 17 illustrates a whole view of the valve seat in the discharge-side check valve according to the embodiment and illustrates a sectional view taken along an XVII-XVII line in FIG. 16.

A valve seat 626 of a discharge-side check valve 60 illustrated in FIG. 15 to FIG. 17 is provided with a contact portion 627 that is brought into contact with the valve element 61, a cutout portion 628 for forming a gap between itself and the base portion 64, and a penetrating portion 629 that provides communication between the cutout portion 628 and a flow portion 60a of liquid L. According to such configuration, a communication portion 60b is formed of a gap between the cutout portion 628 of the valve seat 626 and an inner surface of the base portion 64 and the penetrating portion 629. The communication portion may be formed only of the gap between the valve seat and the base portion of the discharge-side check valve or may be formed only of the penetrating portion provided on the valve seat of the discharge-side check valve.

Moreover, the pump according to the embodiment has a configuration in which the communication portion 6b is formed on the discharge-side check valve 6. However, the pump according to the present invention is not limited to such configuration. For example, as illustrated in FIG. 18, a communication portion 7 of the pump according to the present invention may have a configuration provided with a bypass channel 71 that provides communication between a channel 10a of a pump section 10 and a flow portion 50a of a discharge section 50.

Moreover, the pump according to this embodiment has a configuration in which the communication portion 6b provides continuous communication between the pump section 1 and the discharge section 5. However, the pump according to the present invention is not limited to such configuration. For example, in the pump according to the present invention, the communication portion may have a configuration of providing intermittent communication between the pump section and the discharge section. In summary, in the pump according to the present invention, it is only necessary that the communication portion has a configuration of providing communication between the pump section and the discharge section in a state in which at least the pump section has suctioned liquid L (a state in which the capacity of the pump section has expanded). An example of such configuration is illustrated in FIG. 18 to FIG. 21.

Figure 18:
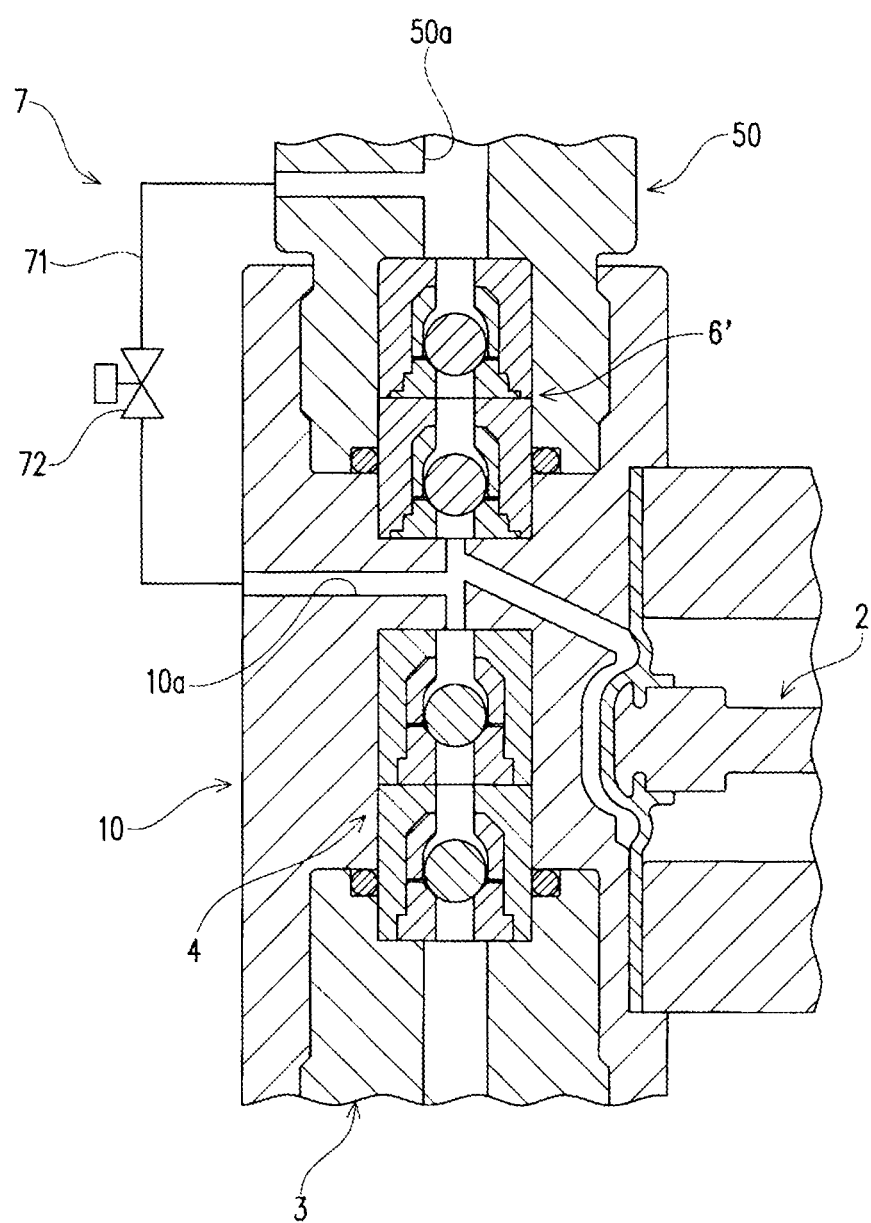
FIG. 18 illustrates an outline view of an essential part of a pump according to still another embodiment of the present invention.

In the pump according to FIG. 18, an opening and closing portion 72 for opening and closing the bypass channel 71 is provided in the communication portion 7, and the opening and closing portion 72 opens the bypass channel 71 in a state in which the pump section 10 has suctioned liquid L. In the pump according to FIG. 18, the opening and closing portion 72 may be a control valve (electric valve) and may have a configuration in which opening and closing control of the opening and closing portion 72 is performed in association with control of the drive section 2 (reciprocal motion control of the shaft 21).

Figure 19:
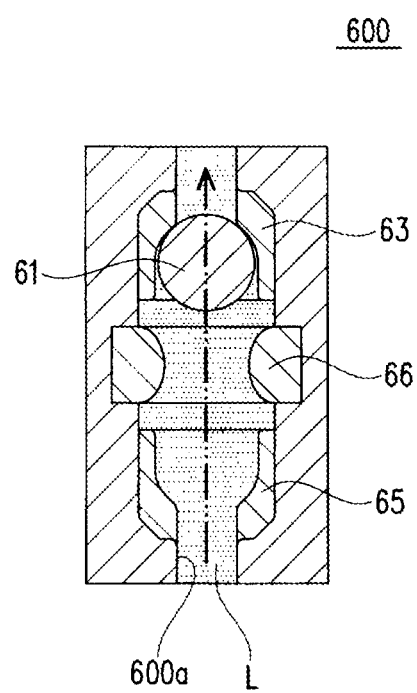
FIG. 19 illustrates a whole sectional view for explaining an operation of a discharge-side check valve according to still another embodiment of the present invention.
Figure 20:
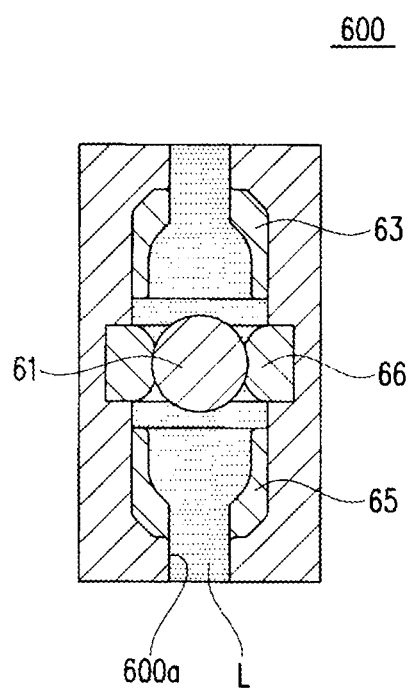
FIG. 20 illustrates a whole sectional view for explaining the operation of the discharge-side check valve according to the embodiment.
Figure 21:
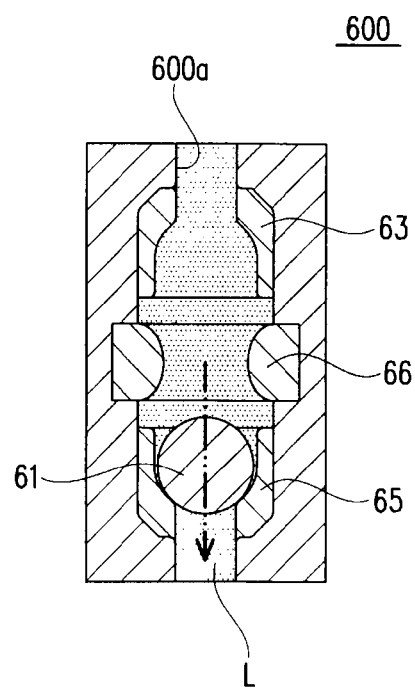
FIG. 21 illustrates a whole sectional view for explaining the operation of the discharge-side check valve according to the embodiment.

Moreover, a discharge-side check valve 600 according to FIG. 19 to FIG. 21 is an opening and closing valve for opening and closing a flow portion 600a. The discharge-side check valve 600 closes the flow portion 600a when the pump section 1 suctions liquid L, and opens the flow portion 600a in a state in which the pump section 1 has suctioned liquid L and when the pump section 1 discharges liquid L.

Specifically, the discharge-side check valve 600 is provided with the first regulating portion 63 for preventing the valve element 61 from moving by a predetermined amount or more on the discharge section 5 side (upper sides in FIG. 19 to FIG. 21) and a second regulating portion 65 for preventing the valve element 61 from moving by a predetermined amount or more on the pump section 1 side (lower sides in FIG. 19 to FIG. 21). Moreover, the discharge-side check valve 600 is provided with an elastic seal portion 66 formed into an annual shape with an inner diameter smaller than a diameter of the valve element 61 between a pair of the regulating portions 63 and 65. An operation of such discharge-side check valve 600 is described below.

As illustrated in FIG. 19, when liquid L is discharged to the discharge section 5 from the pump section 1, the valve element 61 is held or locked by the first regulating portion 63. As the capacity of the pump section 1 expands, the pressure of the pump section 1 becomes negative, and thus, the valve element 61 moves toward the pump section 1 side. At this time, liquid L is suctioned into the pump section 1 from the suction section 3, while as illustrated in FIG. 20, since the valve element 61 is engaged with the seal portion 66 which is elastically deformed, the flow portion 600a of the discharge-side check valve 600 is closed.

Moreover, as the capacity of the pump section 1 expands, the valve element 61 moves to the pump section 1 side while being engaged with the seal portion 66 which is elastically deformed, and then, as illustrated in FIG. 21, the valve element 61 moves to a position at which the valve element 61 is held or locked by the second regulating portion 65. As a result, since the flow portion 600a of the discharge-side check valve 600 is opened, the flow portion 600a of the discharge-side check valve 600 functions as a communication portion that provides communication between the pump section 1 and the discharge section 5 in a state in which the pump section 1 has suctioned liquid L.

Subsequently, as the capacity of the pump section 1 contracts, the valve element 61 moves to the discharge section 5 side. Then, via the state illustrated in FIG. 20, as illustrated in FIG. 19, the valve element 61 moves to a position at which the valve element 61 is held or locked by the first regulating portion 63, and the flow portion 600a of the discharge-side check valve 600 is opened. As a result, liquid L is discharged from the pump section 1 to the discharge section 5. The pump illustrated in FIG. 19 to FIG. 21 may have a configuration in which the valve element is formed having elasticity or the valve element is formed having elasticity and the seal portion is formed rigidity.

Moreover, the pump according to the embodiment has a configuration in which the pump section 1 suctions liquid L, and after the pressure of liquid L in the pump section 1 becomes equal to the pressure of liquid L in the discharge section 5, the pump section 1 discharges liquid L. However, the pump according to the present invention is not limited to such configuration. For example, the pump according to the present invention may have a configuration in which the pump section 1 contracts the capacity and discharges liquid L at timing when the pump section 1 suctions liquid L and the pressure of liquid L in the pump section 1 rises to a predetermined pressure (a pressure higher than the pressure of liquid L in the suction section 3 and lower than the pressure of liquid L in the discharge section 5).

REFERENCE SIGNS LIST

1 Pump section
1a First channel
1b Pump chamber
1c Second channel
2 Drive section
3 Suction section
4 Suctioning-side check valve
5 Discharge section
6 Discharge-side check valve
6a Flow portion
6b Communication portion
61 Valve element
62 Valve seat
621 Contact portion
622 Recessed portion
L Liquid

The invention claimed is:
1. A pump comprising:
a pump section that suctions a liquid by expanding a capacity and discharges the liquid by contracting the capacity;
a suction section for suctioning the liquid into the pump section;
a discharge section for discharging the liquid from the pump section;
a suctioning-side check valve that suppresses a backflow of the liquid from the pump section to the suction section;
a discharge-side check valve that is arranged on an upper side of the suctioning-side check valve, and suppresses a backflow of the liquid from the discharge section to the pump section; and
a communication portion that is provided on the discharge-side check valve, and provides continuous communication between the pump section and the discharge section in a state in which the discharge-side check valve suppresses the backflow of the liquid from the discharge section to the pump, wherein
the discharge-side check valve is provided with a valve element having a spherical shape, a valve seat being provided with a contact portion having a tapered surface shape in contact with the valve element, a regulating portion for preventing the valve element provided in the discharge-side check valve from moving more than a predetermined amount, and a base portion for fixing the valve seat and the regulating portion therein and accommodating the valve element between the valve seat and the regulating portion,
the regulating portion is provided with stopper portions that hold or lock the valve element, the stopper portions protruding inward and being arranged separately from each other so as to allow liquid to flow from the pump section to the discharge section in a state in which the valve element is held or locked by the stopper portions,
the stopper portions have respective lower ends that form an opening of the regulating portion, at least one of the lower ends being located opposite to an upper part of the communication portion on a radial outer side of the contact portion within the base portion,
the pump section is provided with:
a first channel having a fixed capacity with an upper end portion connected to the discharge-side check valve and a lower end portion connected to the suctioning-side check valve;
a pump chamber that is arranged on a lateral side of the suctioning-side check valve and expands and contracts the capacity; and
a second channel having a fixed capacity with an upper end portion connected to the first channel and a lower end portion connected to the pump chamber;
wherein the first channel is connected to the second channel at a portion above a valve provided in the suctioning-side check valve, and
wherein a size of the communication portion is set so that, when the continuously expanding and contracting pump section contracts, a volume of gas mixed in the liquid in the pump section is contracted.
2. The pump according to claim 1, wherein
in the discharge-side check valve:
the valve element moves inside a flow portion through which the liquid is made to flow; and
the valve seat is brought into contact with the valve element so as to suppress the backflow of the liquid from the discharge section to the pump section; and
the valve seat is provided with a recessed portion so that the communication portion is formed in a gap between the valve seat and the valve element.
3. The pump according to claim 2, wherein
a contact portion of the valve seat which contacts the valve element is formed so that a surface has a tapered surface shape; and
the recessed portion is extended along the surface of the contact portion.

4. The pump according to claim 2, wherein
a contact portion of the valve seat which contacts the valve element is formed to have a surface thereof formed into a tapered surface shape; and
the recessed portion is extended along a radial direction.

5. The pump according to claim 1, wherein
in the discharge-side check valve:
the valve element moves inside a flow portion through which the liquid is made to flow; and
the valve seat is brought into contact with the valve element so as to suppress the backflow of the liquid from the discharge section to the pump section; and
the valve seat is provided with a projecting portion so that the communication portion is formed in a gap between the valve seat and the valve element.

6. The pump according to claim 1, wherein
the first channel vertically extends; and
the second channel extends obliquely upwardly from the lower end portion thereof toward the upper end portion thereof.

7. The pump according to claim 6, wherein
the second channel has the lower end portion thereof connected to an upper end portion of the pump chamber.

8. A method for operating a pump wherein the pump is provided with:
a pump section that suctions a liquid by expanding a capacity and discharges the liquid by contracting the capacity;
a suction section for suctioning the liquid into the pump section;
a discharge section for discharging the liquid from the pump section;
a suctioning-side check valve that suppresses a backflow of the liquid from the pump section to the suction section;
a discharge-side check valve that suppresses a backflow of the liquid from the discharge section to the pump section; and
a communication portion that provides continuous communication between the pump section and the discharge section in a state in which the pump section suctions the liquid, wherein
the discharge-side check valve is provided with a valve element having a spherical shape, a valve seat being provided with a contact portion having a tapered surface shape in contact with the valve element, a regulating portion for preventing the valve element provided in the discharge-side check valve from moving by more than a predetermined amount, and a base portion for fixing the valve seat and the regulating portion therein and accommodating the valve element between the valve seat and the regulating portion,
the regulating portion is provided with stopper portions that holds or locks the valve element, the stopper portions protruding inward and being arranged separately from each other so as to allow liquid to flow from the pump section to the discharge section in a state in which the valve element is held or locked by the stopper portions,
the stopper portions have respective lower ends that form an opening of the regulating portion, at least one of the lower ends being located opposite to an upper part of the communication portion on a radial outer side of the contact portion within the base portion,
the communication portion is provided on the discharge-side check valve;
the discharge-side check valve is arranged on an upper side of the suctioning-side check valve; and
the pump section is provided with:
a first channel having a fixed capacity with an upper end portion connected to the discharge-side check valve and a lower end portion connected to the suctioning-side check valve;
a pump chamber that is arranged on a lateral side of the suctioning-side check valve and expands and contracts the capacity; and
a second channel having a fixed capacity with an upper end portion connected to the first channel and a lower end portion connected to the pump chamber, wherein the first channel is connected to the second channel at a portion above a valve provided in the suctioning-side check valve;
the method comprising:
expanding the capacity of the pump section so that the liquid is suctioned from the suction section into the pump section;
allowing the liquid to flow from the discharge section into the pump section via the communication portion so that a volume of gas mixed in the liquid in the pump section is contracted; and
contracting the capacity of the pump section so that the gas of which the volume has been contracted is discharged from the pump section to the discharge section together with the liquid.

\* \* \* \* \*